United States Patent [19]

Kobayashi

[11] 4,261,221

[45] Apr. 14, 1981

[54] CONTROL CABLE POSITIONING DEVICE

[75] Inventor: Tetuo Kobayashi, Ikeda, Japan

[73] Assignee: Nippon Cable System, Inc., Hyogo, Japan

[21] Appl. No.: 26,315

[22] Filed: Apr. 2, 1979

[30] Foreign Application Priority Data

Feb. 14, 1979 [JP] Japan .................................. 54-18680

[51] Int. Cl.³ ............................................. F16C 1/10
[52] U.S. Cl. .............................. 74/501 R; 74/501 P; 403/195; 411/262
[58] Field of Search ...................... 74/501 R, 501 P; 285/81, 92; 403/194, 195, 197; 85/32 CS; 151/14 CS

[56] References Cited

U.S. PATENT DOCUMENTS

| 900,589 | 10/1908 | Ratcliffe | 85/32 CS |
|---|---|---|---|
| 3,587,341 | 6/1971 | Fiddler | 74/501 |
| 3,645,150 | 2/1972 | Crossland | 74/501 P |
| 3,916,723 | 11/1975 | Hawtree et al. | 74/501 R |
| 4,175,450 | 11/1979 | Bennett | 74/501 P |

*Primary Examiner*—Kenneth Dorner
*Attorney, Agent, or Firm*—Armstrong, Nikaido, Marmelstein & Kubovcik

[57] ABSTRACT

A control cable positioning device including a screw member secured to an end of an inner cable which is disposed slidably within the control cable and having a screw surface formed at a part of the peripheral surface thereof; an outer fitting having an inner surface capable of engaging to the peripheral surface of the screw member, a partially cutaway portion and a projection extending downward and capable of bending; and a helical spring so wound as to clamp the peripheral surface and having pawls at both ends thereof extending outward, each pawl being capable of abutting to the respective side surface of the cutaway portion, whereby the length of the inner cable projecting from the conduit can be controlled since the end of the conduit of the control cable is controllable when the projection is bent.

4 Claims, 5 Drawing Figures

CONTROL CABLE POSITIONING DEVICE

BACKGROUND OF THE INVENTION

The present invention relates to a novel positioning device for a control cable, and more particularly to a device for positioning controllably an end of a conduit for a control cable in order to keep constant the length of an inner cable projecting from the end of the conduit. The present invention also relates to a positioning device which functions as a member for connecting the end of the inner cable to various driven means with controlling the length of the inner cable, when the end of the conduit is fixed.

One device of this type as is known in the art is so constructed that a positioning nut is screwed to an end of a conduit or an inner cable and further, in order to prevent the looseness of the positioning nut due to swing, an additional nut for clamping is provided. The thus constructed device has a fatal disadvantage that when the additional nut is loosened, the positioning nut is also loosened, which results in difficulty in precise operation of a driven means due to changing position of the end of the conduit or the inner cable.

OBJECTS OF THE INVENTION

It is an object of the present invention to provide a novel positioning device for a control cable in which an end of an inner cable or a conduit is positioned controllably and the fixed position thereof is never changed, by which precise operation of driven means can be established.

Other objects of the invention will become apparent from the following description given with reference to the accompanying drawings.

DETAILED DESCRIPTION

Figure 1:
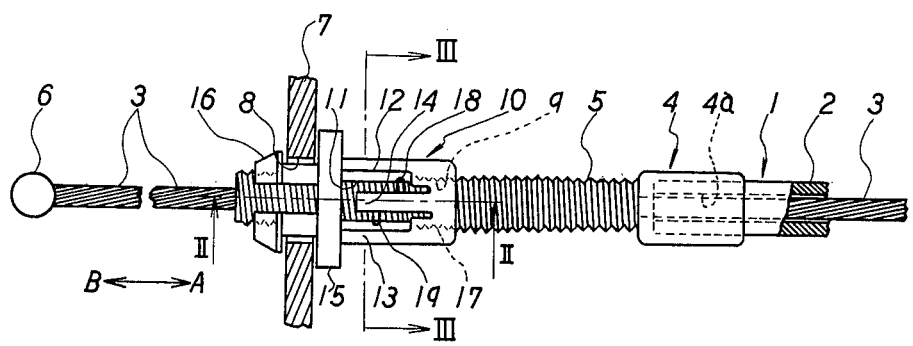
FIG. 1 is a partially cutaway front view showing an embodiment of the present invention.

FIGS. 1 to 4 show an embodiment of the invention. Referring to FIG. 1, numerals 1 and 2 designate a control cable and a conduit, respectively, while numeral 3 designates an inner cable slidably disposed within the conduit 2. A screw member 4 is secured to the end of the conduit 2, a part of the peripheral surface 5 thereof being a screw surface.

One end of the inner cable 3 extends through a bore 4a formed in the screw member 4 into a driven means such as a clutch or an accelerator and is engaged thereto by an end fitting 6 made of metal.

The length from an outer fitting 10 abutted to or engaged to a fixed engagement plate 7 to the end fitting 6 must be maintained constant in order to ensure precise operation of the driven means by a drive means (not shown). The engagement plate 7 is fixed through a bore 8 to the outer fitting 10.

The drive means including a pedal or a lever is connected to other end of the inner cable 3. In general, a return spring (not shown) which may be mounted to the driven means provides an external force to return the pulling force of the inner cable 3 given by the drive means from the direction of A to the direction B.

Figure 2:
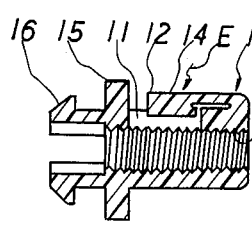
FIG. 2 is a sectional view taken on line II—II of FIG. 1.

As shown in FIG. 2, the outer fitting 10 is secured onto the peripheral surface 5 of the screw member 4 through an inner surface 9 having a screw thread. The outer fitting 10 is formed with a cutaway portion 11 including side surfaces 12 and 13 and a projection 14 capable of bending in the direction of E in the cutaway portion.

Numeral 15 is a flange abutting to the engagement plate 7. Numeral 16 is a pair of pawls extending through the engagement plate 7 and engaged thereto with their enlarged portions.

A helical spring 17 is mounted on the peripheral surface 5 of the screw member 4 at the position relative to the cutaway portion 11 and has two pawls 18, 19 bent outward. The pawls 18, 19 are so positioned as to abut to the side surfaces 12, 13. Further, as shown in FIG. 4, the projection 14 can be positioned at a middle point between the pawls 18, 19 when bent in the direction of E.

The advantages and operations of the positioning device of the present invention will be explained below.

Figure 3:
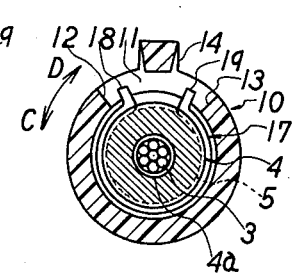
FIG. 3 is a sectional view taken on line III—III of FIG. 1.

Referring to FIG. 3, when the outer fitting 10 is forced to rotate in the direction of C relative to the screw member 4, the side surface 13 of the cutaway portion 11 pushes the pawl 19 into the direction of C thus tightening the helical spring 17 which results in preventing the helical spring 17 and the outer fitting 10 from rotating in the direction of C. Further, when the outer fitting 10 is forced to rotate in the direction of D, the side surface 12 pushes the pawl 18 into the direction of D thus tightening the helical spring 17 which results in preventing the helical spring 17 and the outer fitting 10 from rotating in the direction of D. Thus, the determined length of the inner cable from the outer fitting 10 to the end fitting 6 is maintained constant, since the outer fitting 10 is not moved in the directions of A and B relative to the screw member 4. Therefore, the driven means can be operated precisely.

Figure 4:
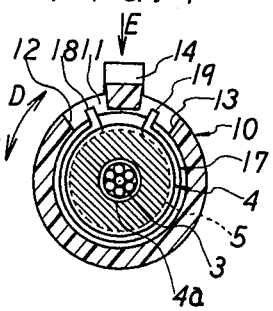
FIG. 4 is a view showing the operation of the embodiment of FIG. 1 when a projection of an outer fitting is bent downward.

Referring to FIGS. 2 and 4, when the projection 14 is bent to the direction of E and the outer fitting 10 is rotated in the direction of C or D relative to the screw member 4, the helical spring 17 is so pushed as to be loosened thus rotating the helical spring 17 and the outer fitting 10 freely in the direction of C or D. Therefore, the outer fitting 10 can be moved in the direction of A or B shown in FIG. 1, by which the length of the inner cable 3 from the outer fitting 10 to the end fitting 6 can be controlled freely. Therefore, the driven means can be operated precisely and stably.

In the embodiment shown in FIGS. 1 to 4, in case of pulling operation only, the pawl 16 is free and the flange 15 abuts to the engagement plate 15 since the outer fitting 10 is never separated from the engagement plate 7 in the direction of A in FIG. 1.

Figure 5:
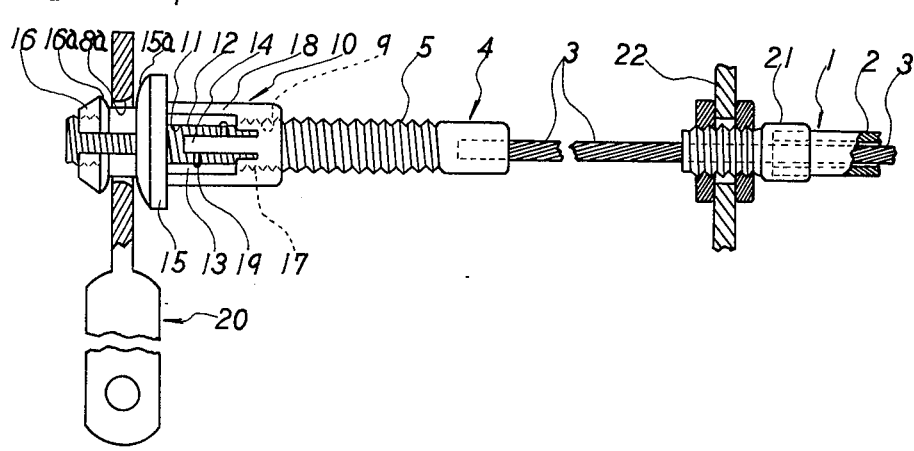
FIG. 5 is a partially cutaway front view showing another embodiment of the invention.

Referring now to the embodiment of FIG. 5, wherein the numerals are identical with those in the corresponding parts shown in FIGS. 1 to 4, a screw member 4 is secured to the end of an inner cable 3 and an outer fitting 10 is engaged to the engagement plate 7 of a lever 20 as a driven means, and the end of a conduit 2 is fixed by means of a cap 21 to a panel 22. The advantages and operations of the embodiment are substantially the same as the embodiment shown in FIGS. 1 to 4.

In the embodiment shown in FIG. 5, the engagement plate 7 may be provided with a tapered bore 8a, and further in order not to prevent the engagement plate 7 from rotating in the direction of F or G, an abutting surface 15a of the flange 15 and a engagement surface 16a of the pawls 16 may be curved.

It is to be understood that the invention is not limited in its application to the details of construction and arrangement of parts set forth in the above general description or illustrated in the accompanying drawings since the invention is capable of other embodiment and of being practiced or carried out in various ways. Also, it is to be understood that the phraseology or terminology employed herein is for the purpose of description and not limitation.

What is claimed is:

1. A positioning device for a control cable which comprises a screw member secured to an end of an inner cable which is disposed slidably within the control cable, at least a part of the peripheral surface thereof being a screw surface; an outer fitting having an inner surface capable of engaging to the peripheral surface of the screw member, a partially cutaway portion, and a projection extending downward and capable of bending; and a helical spring so wound as to clamp the peripheral surface of the screw member and having pawls at both ends thereof extending outward, each pawl being capable of abutting to the respective side surface of the cutaway portion, and the projection of the outer fitting being positioned between the pawls when bending.

2. The positioning device of claim 1, wherein the outer fitting is provided at one end thereof with at least one pair of pawls for engagement with a support.

3. A positioning device for a control cable which comprises a screw member secured to an end of a conduit having an inner cable which is disposed slidably within the conduit, at least a part of the peripheral surface thereof being a screw surface; an outer fitting having an inner surface capable of engaging to the peripheral surface of the screw member, a partially cutaway portion, and a projection extending downward and capable of bending; and a helical spring so wound as to clamp the peripheral surface of the screw member and having pawls at both ends thereof extending outward, each pawl being capable of abutting to the respective side surface of the cutaway portion, and the projection of the outer fitting being positioned between the pawls when bending.

4. The positioning device of claim 3 wherein the outer fitting is provided at one end thereof with at least one pair of pawls for engagement with a support.

* * * * *